No. 823,876. PATENTED JUNE 19, 1906.
W. N. KEEN.
NUT LOCK.
APPLICATION FILED JULY 3, 1905.

Witnesses
W. C. Dashiell
N. C. Healy

Inventor
William N. Keen
By James J. Sheehy
Attorney.

UNITED STATES PATENT OFFICE.

WILLIAM N. KEEN, OF ABITA SPRINGS, LOUISIANA, ASSIGNOR OF ONE-HALF TO P. H. HANSBROUGH, OF ABITA SPRINGS, LOUISIANA.

NUT-LOCK.

No. 823,876.  Specification of Letters Patent.  Patented June 19, 1906.

Application filed July 3, 1905. Serial No. 268,141.

*To all whom it may concern:*

Be it known that I, WILLIAM N. KEEN, a citizen of the United States, residing at Abita Springs, in the parish of St. Tammany and State of Louisiana, have invented new and useful Improvements in Nut-Locks, of which the following is a specification.

My invention pertains to nut-locks; and it consists in the peculiar and advantageous nut-lock and nut-locking washer hereinafter described, and particularly defined in the claim appended.

Figure 1:
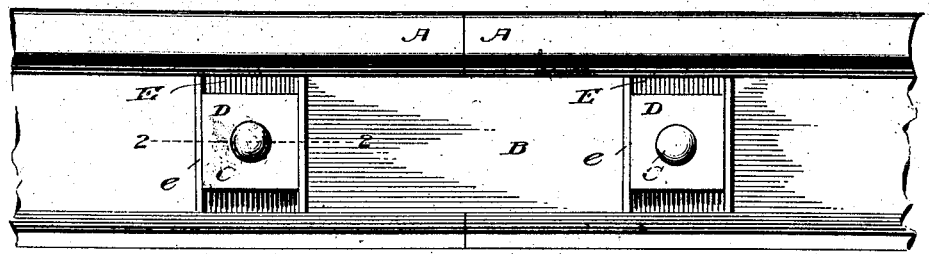
Figure 2:
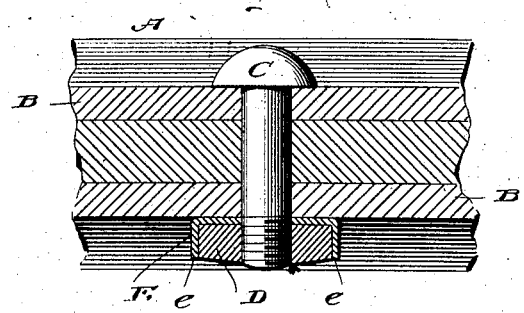
Figure 3:
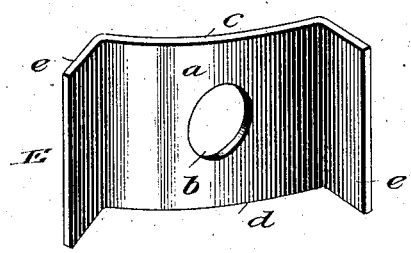
Figure 4:
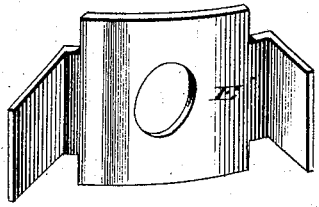

In the accompanying drawings, forming part of this specification, Figure 1 is a side elevation of a rail-joint embodying two of my novel nut-locks. Fig. 2 is an enlarged detail section taken in the plane indicated by the line 2 2 of Fig. 1 and illustrating one of the nut-locks, and Fig. 3 is a perspective view illustrating one of the nut-locking washers removed. Fig. 4 is a perspective view of a modified washer.

Referring by letter to said drawings, and more particularly to Figs. 1 to 3 thereof, A A are the meeting portions of two rails, and B B are splice-bars arranged at opposite sides of the webs of the rails in the ordinary well-known manner.

The nut-locks shown in Fig. 1 are identical in construction, and therefore a detailed description of the one shown in Figs. 2 and 3 will suffice to impart a definite understanding of both. The said lock, Figs. 2 and 3, comprises a headed and threaded bolt C, extending through registered apertures in the splice-bars and rail-web, a nut D, mounted on the threaded portion of said bolt, and a washer E, also mounted on the bolt and interposed between the inner side of the nut and the outer side of the adjacent splice-bar. The novelty of my invention resides chiefly in the said washer E, which is a single plate of suitable sheet metal and is preferably of a width corresponding to the distance between the upper side of the base and the under side of the head of each rail, so as to enable a rail to hold it against turning on the bolt. The body $a$ of the washer is normally bent in the direction of the length thereof and is provided with a central aperture $b$, whereby it may be mounted on the bolt with its concave side $c$ next to the adjacent splice-bar and its convex side $d$ outermost. At the ends of the said body $a$ outwardly-inclined wings $e$ are provided. These wings are normally disposed as shown in Fig. 3 relative to the body, and hence it will be observed that when the washer is placed on the bolt and against the splice-bar they will permit of the ready interposition of a prying instrument between the ends of the washer and the bar, with a view of bending the said ends against opposite sides of the nut.

By virtue of the body of the washer being concavo-convex and the washer as a whole being formed of suitable sheet metal it will be observed that when the nut is turned up on the bolt the washer will be pressed flat between the nut and the adjacent splice-bar and will be placed under tension, with the result that it will serve to prevent rattling of the parts and at the same time will assist in preventing casual turning of the nut on the bolt. Subsequent to the washer being placed under tension between the nut and the splice-bar, as stated, the ends of the washer are turned against opposite sides of the nut to positively lock the same. I prefer to turn both ends of the washer against the nut as shown and described; but it is obvious that the nut may be securely locked by simply turning one end of the washer against the same.

In Fig. 4 I have shown a cruciform washer E' embodying my invention, which may be used when desired in lieu of the rectangular washer shown in Figs. 1 to 3.

It will be gathered from the foregoing that my novel nut-locking washer is inexpensive and strong and when properly applied is secured of itself against movement with respect to a rail and is adapted to strongly and securely hold a nut against casual rotation.

When the nuts D are turned up on the bolts, the wings $e$ of the washers E will bend backwardly under the pressure of the nuts, and hence will not interfere with the tightening of the nuts.

Having described my invention, what I claim, and desire to secure by Letters Patent, is—

As an article of manufacture, a nut-locking washer, formed of sheet metal and comprising a body having an aperture to receive a bolt and also having a concave inner side and a convex outer side, and a wing at one end of the body integral therewith; the said wing being disposed at an obtuse angle to the body, whereby it is adapted to permit of the placing of a prying instrument between itself and an adjacent fish-plate and is also adapted to bend backwardly when a nut is turned against the face of the washer.

In testimony whereof I have hereunto set my hand in presence of two subscribing witnesses.

WILLIAM N. KEEN

Witnesses:
EMILE TALLEY,
H. B. COOK.